United States Patent
Lai

(10) Patent No.: US 8,270,502 B2
(45) Date of Patent: Sep. 18, 2012

(54) TIMING-FREQUENCY OFFSET AND CARRIER-FREQUENCY OFFSET ESTIMATIONS FOR MULTI-CARRIER MODULATED SIGNALS USING PILOT TONES

(75) Inventor: Yhean-Sen Lai, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 1286 days.

(21) Appl. No.: 11/956,589

(22) Filed: Dec. 14, 2007

(65) Prior Publication Data

US 2009/0154613 A1 Jun. 18, 2009

(51) Int. Cl.
*H04K 1/10* (2006.01)
(52) U.S. Cl. ........ 375/260; 375/262; 375/267; 375/299; 375/316; 375/346
(58) Field of Classification Search .................. 375/150, 375/259, 260, 262, 267, 290, 295, 297, 299, 375/306, 316, 322, 271, 350, 222, 269, 302, 375/318, 330, 342–346
See application file for complete search history.

(56) References Cited

U.S. PATENT DOCUMENTS

| | | | | |
|---|---|---|---|---|
| 7,505,523 | B1 * | 3/2009 | Lee et al. | 375/260 |
| 7,529,179 | B1 * | 5/2009 | Lee et al. | 370/208 |
| 7,738,538 | B1 * | 6/2010 | Tung | 375/150 |
| 8,019,036 | B2 * | 9/2011 | Voltz et al. | 375/373 |
| 8,064,913 | B2 * | 11/2011 | Gummadi et al. | 455/441 |
| 2004/0184551 | A1 * | 9/2004 | Liu et al. | 375/260 |
| 2008/0151980 | A1 * | 6/2008 | Lindoff et al. | 375/226 |
| 2008/0273641 | A1 * | 11/2008 | Yang et al. | 375/359 |
| 2009/0052561 | A1 * | 2/2009 | Baxley et al. | 375/260 |
| 2009/0086841 | A1 * | 4/2009 | Guo et al. | 375/267 |
| 2009/0232234 | A1 * | 9/2009 | Du | 375/260 |
| 2010/0246719 | A1 * | 9/2010 | Ko et al. | 375/303 |

OTHER PUBLICATIONS

"ML Estimation of Time and Frequency Offset in OFDM Systems" by Jan-Jaap van de Beek, et al., IEEE Transactions on Signal Processing, vol. 45, No. 7, Jul. 1997, pp. 1800-1805.
"OFDM/FM Frame Synchronization for Mobile Radio Data Communication" by William D. Warner and Cyril Leung, IEEE Transactions on Vehicular Technology, vol. 42, No. 3, Aug. 1993, pp. 302-313.

* cited by examiner

*Primary Examiner* — Hirdepal Singh
(74) *Attorney, Agent, or Firm* — Mendelsohn, Drucker & Associates, P.C.; Craig M. Brown; Steve Mendelsohn

(57) ABSTRACT

In one embodiment, a demodulator demodulates a multi-carrier modulated signal having two pilot tones. The demodulator calculates a first phase angle for the first pilot tone and a second phase angle for the second pilot tone based on the time-domain multi-carrier modulated signal. A timing-frequency offset estimate is calculated using the first and second phase angles. Further, a fine carrier-frequency offset estimate is calculated for each pilot tone based on the corresponding phase angle and the timing-frequency offset estimate. Each fine carrier-frequency offset estimate is combined with a coarse estimate and weighted. The weighted estimates are then combined. In further embodiments, the timing-frequency offset estimate is weighted and combined with a weighted timing-frequency offset estimate generated using a cyclic prefix. In yet further embodiments, the weighted carrier-frequency offset estimates are combined with a weighted carrier-frequency offset estimate generated using a cyclic prefix.

29 Claims, 4 Drawing Sheets

TIMING-FREQUENCY OFFSET AND CARRIER-FREQUENCY OFFSET ESTIMATIONS FOR MULTI-CARRIER MODULATED SIGNALS USING PILOT TONES

BACKGROUND OF THE INVENTION

1. Field of the Invention

The present invention relates to communication systems, and more specifically, to demodulation of multi-carrier modulated signals, such as orthogonal frequency division multiplexed (OFDM) signals.

2. Description of the Related Art

In communication systems, a transmitted signal might not be received by a receiver for various reasons, such as a lack of a line-of-sight between the transmitter and receiver. Additionally, in some instances, the transmitted signal might be received; however, the signal quality might be reduced due to the effects of fading, noise, or other interference. In order to maintain continuity in the transmission and reduce the effects of interference, a communications system may transmit multiple versions of a data stream using transmit diversity techniques, such as spatial diversity, temporal diversity, and frequency diversity. The following background discusses a satellite digital audio radio service (SDARS) system, such as that operated by Sirius Satellite Radio Inc., that employs all three of these transmit diversity techniques.

FIG. 1 shows a simplified diagram of one implementation of a SDARS system 100. Program information, such as music and talk radio, is generated at a studio 102 and provided to a remote uplink site 104, which uplinks the information to a first Sirius Satellite Radio satellite 108 and a second Sirius Satellite Radio satellite 110. The first satellite 108 broadcasts a first time-division multiplexed (TDM) version of the program information over a first frequency range. The second satellite 110 broadcasts a second TDM version of the program information over a second frequency range (frequency diversity), where the second TDM version is delayed with respect to the first TDM version (temporal diversity). In addition, the program information is directly uplinked from the studio 102 to a very small aperture terminal (VSAT) satellite 106. The VSAT satellite 106 provides the program information to terrestrial repeaters 112, which broadcast the information over a third frequency range in a coded orthogonal frequency division multiplexed (COFDM) format. Service subscribers receive zero, one, or more of the broadcast signals using stationary or mobile receivers (e.g., 114). Each signal received traverses a separate path from the respective satellite or terrestrial repeater to the receiver (spatial diversity), and the particular signals received depend on the position of the receiver, the positions of the satellites, and the positions of the terrestrial repeaters.

SUMMARY OF THE INVENTION

In one embodiment, the present invention is a method for demodulating a multi-carrier modulated signal having at least two pilot tones. The method comprises generating a pilot-based carrier-frequency offset estimate based on the at least two pilot tones. The multi-carrier modulated signal is adjusted based on the pilot-based carrier-frequency offset estimate, and then the multi-carrier modulated signal is demodulated.

In another embodiment, the present invention is a receiver for implementing the method described in the previous paragraph. The receiver comprises a carrier-frequency offset estimator, a carrier-frequency offset compensator, and a demodulator. The carrier-frequency offset estimator is adapted to generate a pilot-based carrier-frequency offset estimate based on the at least two pilot tones. The carrier-frequency offset compensator is adapted to adjust the multi-carrier modulated signal based on the pilot-based carrier-frequency offset estimate. The demodulator is adapted to demodulate the adjusted multi-carrier modulated signal.

In yet another embodiment, the present invention is a method for demodulating a multi-carrier modulated signal having at least two pilot tones and a cyclic prefix. The method comprises generating a pilot-based timing-frequency offset estimate based on the at least two pilot tones and generating a prefix-based timing-frequency offset estimate based on the cyclic prefix. The pilot-based timing-frequency offset estimate and the prefix-based timing-frequency offset estimate are combined to generate a combined timing-frequency offset estimate. The multi-carrier modulated signal is adjusted based on the combined timing-frequency offset estimate, and the adjusted multi-carrier modulated signal is demodulated.

In yet a further embodiment, the present invention is a receiver for implementing the method described in the previous paragraph. The receiver comprises a timing-frequency offset estimator, a timing-frequency offset compensator, and a demodulator. The timing-frequency offset estimator is adapted to: (i) generate a pilot-based timing-frequency offset estimate based on the at least two pilot tones, (ii) generate a prefix-based timing-frequency offset estimate based on the cyclic prefix, and (iii) combine the pilot-based timing-frequency offset estimate and the prefix-based timing-frequency offset estimate to generate a combined timing-frequency offset estimate. The timing-frequency offset compensator is adapted to adjust the multi-carrier modulated signal based on the combined timing-frequency offset estimate. The demodulator is adapted to demodulate the adjusted multi-carrier modulated signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

For purposes of this description and unless explicitly stated otherwise, each numerical value and range should be interpreted as being approximate as if the word "about" or "approximately" preceded the value of the value or range. Further, reference herein to "one embodiment" or "an embodiment" means that a particular feature, structure, or characteristic described in connection with the embodiment can be included in at least one embodiment of the invention.

The appearances of the phrase "in one embodiment" in various places in the specification are not necessarily all referring to the same embodiment, nor are separate or alternative embodiments necessarily mutually exclusive of other embodiments. The same applies to the term "implementation."

Figure 1:
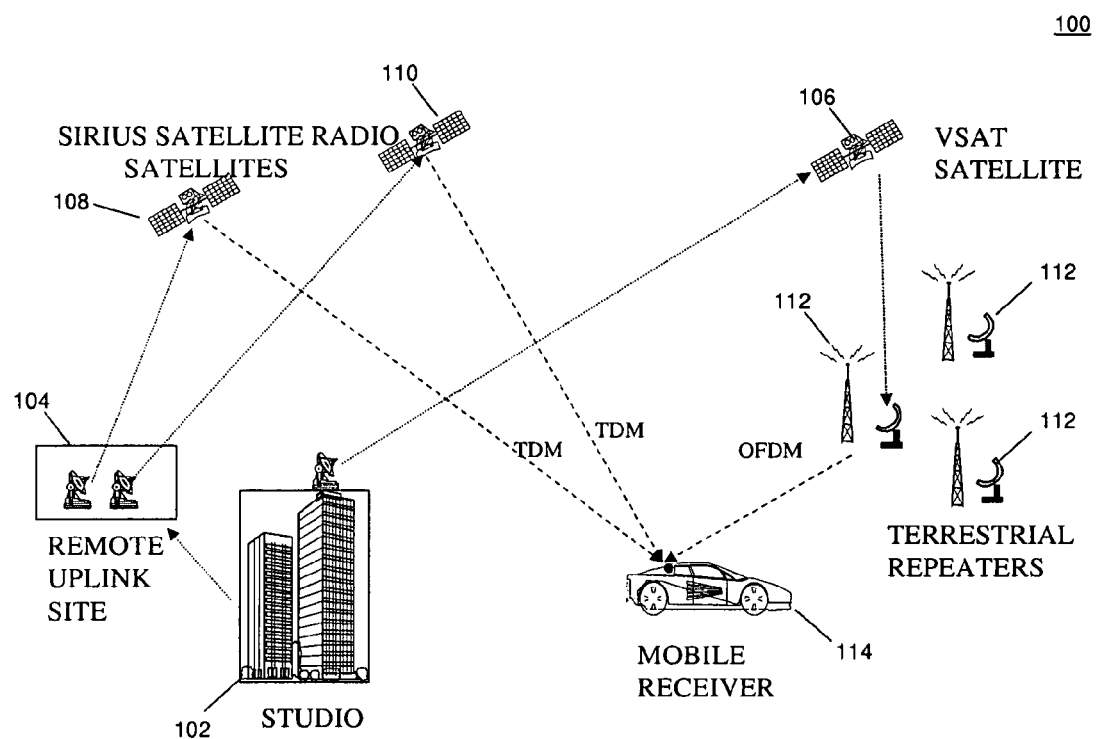
FIG. 1 shows a simplified diagram of one implementation of a satellite digital audio radio service (SDARS) system.
Figure 2:
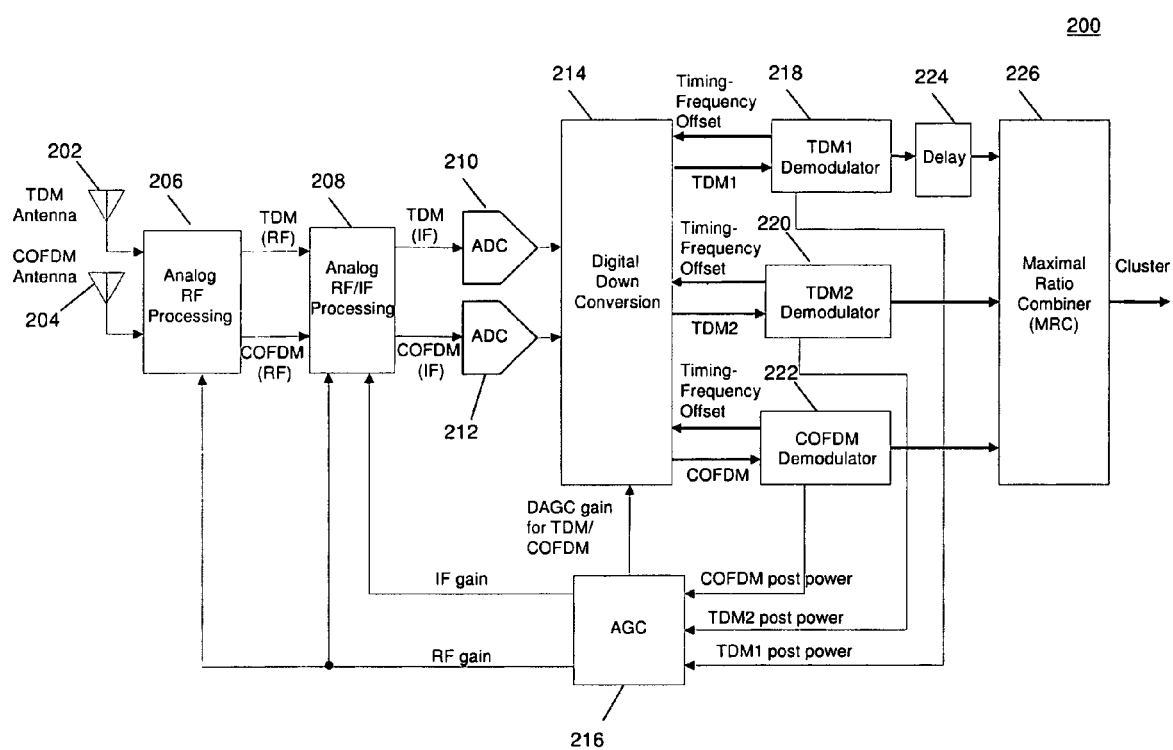
FIG. 2 shows a simplified block diagram of one implementation of an SDARS receiver.

FIG. 2 shows a simplified block diagram of one implementation of a satellite digital audio radio service (SDARS) receiver 200. Receiver 200 has antenna 202 for receiving the two analog time-division multiplexed (TDM) signals and antenna 204 for receiving the analog coded orthogonal frequency division multiplexing (COFDM) signal. Depending on the position of the receiver and the TDM satellites, TDM antenna 202 might receive zero, one, or both of the TDM signals. Further, depending on the position of the receiver and the terrestrial repeaters, COFDM antenna 204 might or might not receive the COFDM signal. To recover the transmitted program information; however, the two antennas must receive at least one of the two TDM signals or the COFDM signal. For the following description, assume that the positions of receiver 200, the satellites, and the terrestrial repeaters are such that receiver 200 receives all three of the broadcast signals.

Analog radio-frequency (RF) processing 206 separately processes the output of TDM antenna 202 and the output of COFDM antenna 204 using low noise amplification (LNA) and RF filtering. The LNA applied to the COFDM signal is based on RF gain adjustments received from automatic gain controller (AGC) 216. Radio frequency/intermediate frequency (RF/IF) processing 208 maintains the separate processing paths for the TDM and COFDM signals. The TDM signals and the COFDM signal are amplified using RF gain adjustments received from AGC 216, RF filtered, and down-converted to their own intermediate frequencies (IF). The analog IF signals are bandpass filtered, and amplified based on IF gain adjustments received from AGC 216 to produce amplified IF signals. The amplified IF signals are then digitized by analog-to-digital converters (ADC) 210 and 212 and provided to digital down converter (DDC) 214. DDC 214 separates the two digital TDM signals and converts the digital TDM signals and the digital COFDM signal into their own baseband signal bandwidths using Hilbert transformation, bandshifting, fixed decimation, and variable resampling. Variable resampling is controlled by timing-frequency offset estimates generated by TDM1 demodulator 218, TDM2 demodulator 220, and COFDM demodulator 222.

TDM1 demodulator 218 and TDM2 demodulator 220 extract soft symbols (e.g., quadrature-phase-shift-keyed (QPSK) symbols) from the first and second digital TDM signals (i.e., TDM1 and TDM2), respectively, using processing such as matched filtering, timing-error detection, frame synchronization, decision-feedback equalization, and timing and framing acquisition. COFDM demodulator 222 extracts soft symbols (e.g., QPSK symbols) from the COFDM signal using processing such as timing-error detection, carrier-frequency offset detection (coarse and fine), carrier-frequency offset compensation, Fourier transformation, differential demodulation, and frequency deinterleaving. The soft symbols corresponding to the first TDM signal are delayed by delay block 224 to achieve proper synchronization with the second TDM signal and the COFDM signal. The soft symbols corresponding to the first (delayed) TDM signal, the second TDM signal, and the COFDM signal are then weighted and combined by maximal ratio combiner (MRC) 226 to generate a single data stream that is representative of the original program information. Note that, in addition to generating the soft symbols, TDM1 demodulator 218, TDM2 demodulator 220, and COFDM demodulator 222 generate post power estimates for the first TDM signal, the second TDM signal, and the COFDM signal, respectively, that are used by AGC 216 for determining gain adjustments.

Figure 3:
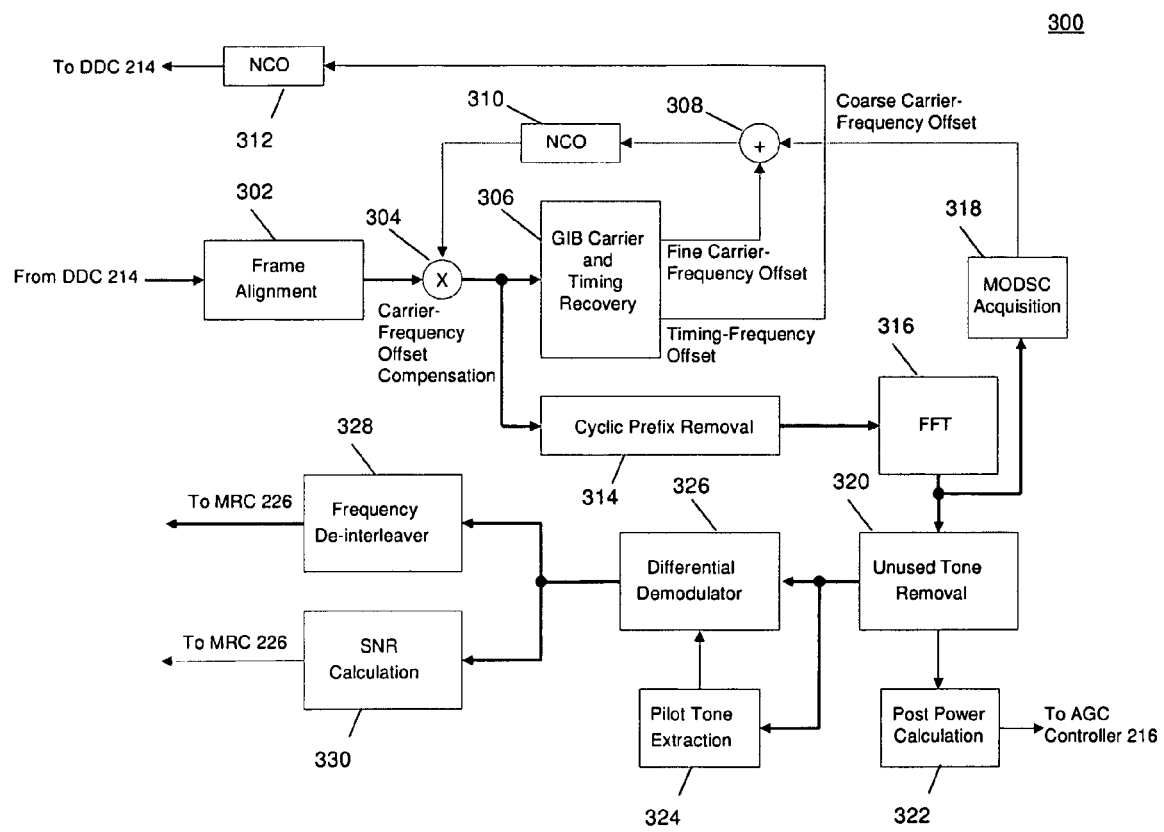
FIG. 3 shows a simplified block diagram of one implementation of a coded orthogonal frequency division multiplexing (COFDM) demodulator that may be used to implement the COFDM demodulator of the receiver of FIG. 2.

FIG. 3 shows a simplified block diagram of one implementation of a COFDM demodulator 300 that may be used to implement COFDM demodulator 222 of FIG. 2. Frame alignment 302 receives the baseband digital COFDM signal from DDC 214 of FIG. 2 and identifies the boundaries of each COFDM symbol. The boundaries are determined using autocorrelation calculations that exploit the similarities between each COFDM symbol and its corresponding cyclic prefix. Carrier-frequency offset compensator 304 compensates for differences between the frequency of a carrier of the COFDM signal received at the receiver and the frequency of the corresponding carrier reference signal at the receiver. These differences result from, e.g., (1) differences between the transmitter and receiver oscillators and (2) Doppler effects. Note that the carrier-frequency offset is the same for each different carrier of a COFDM (multi-carrier) symbol. The carrier-frequency adjusted COFDM signal is then provided to cyclic prefix remover 314 and guard interval based (GIB) carrier and timing recovery processing 306.

GIB carrier and timing recovery processing 306 generates fine carrier-frequency offset estimates (e.g., within one half of the carrier spacing) based on autocorrelation calculations similar to those used for frame alignment 302. The fine carrier-frequency offset estimates are combined, via coarse/fine carrier-frequency offset combiner 308, with coarse carrier-frequency offset estimates generated (e.g., to the nearest integer multiple of subcarrier spacing) by modulo-subcarrier (MODSC) acquisition processing 318. The resulting combined carrier-frequency offset estimates are numerically oscillated via numerically controlled oscillator (NCO) 310 for use by carrier-frequency offset compensator 304. GIB carrier and timing recovery processing 306 also generates timing-frequency offset estimates based on autocorrelation calculations similar to those used for frame alignment 302. These estimates are used to correct differences between the sample frequency of a COFDM symbol received at a receiver and the sampling frequency used to decode that received COFDM symbol. These differences result from, e.g., (i) differences between the reference clock frequencies of the transmitter and receiver and (ii) Doppler effects. The timing-frequency offset estimates are similarly numerically oscillated via NCO 312 and provided to DDC 214 of FIG. 2.

Cyclic prefix remover 314 removes the cyclic prefix from each COFDM symbol, thereby aligning each COFDM symbol for fast Fourier transform (FFT) processing 316. FFT processing 316 transforms each COFDM symbol from the time domain into a set of frequency-domain symbols (e.g., differentially-modulated quadrature-phase-shift keyed (DQPSK) symbols), where the set of frequency-domain symbols may comprise data symbols, pilot symbols, and unused symbols. Unused tone remover 320 removes the unused symbols from each set, and pilot tone extractor 324 extracts the pilot symbols from the remaining frequency-domain symbols in a set. A post power estimate is generated by post power calculator 322 and provided to AGC 216 of FIG. 2 for use in generating gain adjustments. Differential demodulator 326 differentially demodulates the data symbols in each set of frequency-domain symbols using the pilot symbols extracted from the set. Frequency de-interleaver 328 de-interleaves the differentially-demodulated data symbols (e.g., QPSK symbols) to restore the data symbols back to the original data sequence, and provides the data symbols to MRC 226 of FIG.

2. Signal-to-noise ratio (SNR) calculator 330 calculates the SNR of the data symbols and provides the SNR to MRC 226.

When an SDARS receiver, such as receiver 200, is in a multi-path environment, the accuracy of the COFDM demodulator in estimating the timing-frequency offset and carrier-frequency offsets might be reduced. To minimize this reduction in accuracy, a COFDM demodulator may generate timing-frequency offset estimates and fine carrier-frequency offset estimates using pilot tones transmitted within the COFDM signal. Further, the COFDM demodulator may combine (i) the timing-frequency offset estimates generated using pilot tones with those generated using cyclic prefixes to generate more reliable timing-frequency offset estimates, and (ii) the fine carrier-frequency offset estimates generated using pilot tones with those generated using cyclic prefixes to generate more reliable carrier-frequency offset estimates.

Figure 4:
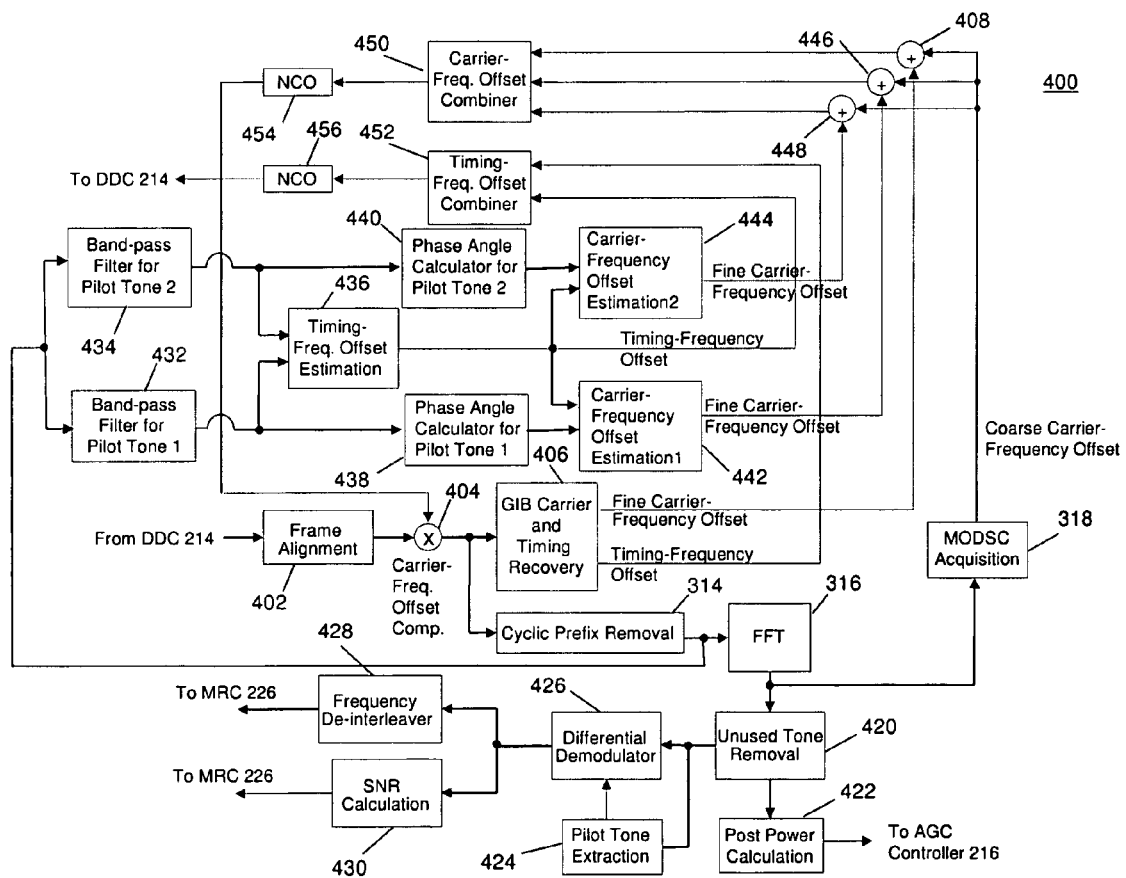
FIG. 4 shows a simplified block diagram of a COFDM demodulator that may be used to implement the COFDM demodulator of the receiver of FIG. 2 according to one embodiment of the present invention.

FIG. 4 shows a simplified block diagram of a COFDM demodulator 400 that may be used to implement COFDM demodulator 222 of FIG. 2 according to one embodiment of the present invention. Demodulator 400 has frame alignment 402, carrier frequency offset compensator 404, GIB carrier and timing recovery processing 406, coarse/fine carrier frequency offset combiner 408, cyclic prefix remover 314, FFT processing 316, MODSC acquisition processing 318, unused tone remover 420, post-power calculator 422, pilot tone extractor 424, differential demodulator 426, frequency de-interleaver 428, and SNR calculator 430, which perform operations analogous to those of the equivalent processing of demodulator 300 of FIG. 3. Further, as described below, demodulator 400 has processing for generating timing-frequency offset estimates and fine carrier-frequency offset estimates using two, possibly unmodulated pilot tones, and for combining these estimates with those generated by GIB carrier and timing recovery processing 406.

Bandpass filter 1 432 receives each OFDM symbol and allows pilot tone 1 to pass to timing-frequency offset calculator 436 and phase angle calculator 1 438. Pilot tone 1 may be represented as shown in Equation (1)

$$P_1(t)=A_1 e^{j(w_{1s}+w_c)(t-\theta_1)}=A_1 e^{j2\pi(f_{1s}+f_c(t))t} e^{-j2\pi(f_{1s}+f_c(t))\theta_1} \quad (1)$$

where $A_1$ is the amplitude of the received pilot tone 1, $w_{1s}$ is the reference angular carrier-frequency, $f_{1s}$ is the reference carrier-frequency, $w_c$ is the angular carrier-frequency offset, $f_c(t)$ is the carrier-frequency offset, and $\theta_1$ is the timing-phase delay. In passing pilot tone 1, bandpass filter 432 may be centered at frequency $f_{1s}$ with a bandwidth of $$\pm \frac{\Delta f_{sc}}{2},$$

where $\Delta f_{sc}$ is the frequency separation between two adjacent subcarriers of an OFDM symbol.

Similarly, bandpass filter 434 receives each OFDM symbol and allows pilot tone 2 to pass to timing-frequency offset calculator 436 and phase angle calculator 2 440. Pilot tone 2 may be represented as shown in Equation (2)

$$P_2(t)=A_2 e^{j(w_{2s}+w_c)(t-\theta_2)}=A_2 e^{j2\pi(f_{2s}+f_c(t))t} e^{-j2\pi(f_{2s}+f_c(t))\theta_2} \quad (2)$$

where $A_2$ is the amplitude of the received pilot tone 2, A is the reference amplitude, $w_{2s}$ is the reference angular carrier-frequency, $f_{2s}$ is the reference carrier-frequency, $w_c$ is the angular carrier-frequency offset, $f_c$ is the carrier-frequency offset, and $\theta_2$ is the timing-phase delay. In passing pilot tone 2, bandpass filter 434 may be centered at frequency $f_{2s}$ with a bandwidth of $$\pm \frac{\Delta f_{sc}}{2}.$$

Timing-frequency offset estimator 436 calculates a timing-frequency offset estimate by multiplying pilot tone 2 $P_2(t)$ by the complex conjugate of pilot tone 1 $P_1(t)$ as shown in Equation (3) below:

$$P_2(t) \times P_1^*(t) = A_2 A_1 e^{j[(w_{2s}-w_{1s})t-w_{2s}\theta_2+w_{1s}\theta_1]} = A_2 A_1 e^{j2\pi[(f_{2s}-f_{1s})t-f_{2s}\theta_2+f_{1s}\theta_1]} \quad (3)$$

Note that, when the frequency of the receiver is the same as the frequency of the transmitter (including any Doppler effects), $P_2(t) \times P_1^*(t)$ will be a sinusoid having a frequency of $f_{2s}-f_{1s}$ as shown in Equation (3). However, when the frequency of the receiver is not the same as the frequency of the transmitter, the frequency of $P_2(t) \times P_1^*(t)$ might not be $f_{2s}-f_{1s}$. In this case, the magnitude of the timing-frequency offset is the difference between the frequency of $P_2(t) \times P_1^*(t)$ and $f_{2s}-f_{1s}$.

The timing-frequency offset estimate from calculator 436 and the timing-frequency offset estimate from GIB 406 may then be weighted, possibly equally, and combined by timing-frequency offset combiner 452. Additionally, prior to weighting, the magnitudes of the two estimates may optionally be compared to a timing-frequency offset estimate threshold to determine whether an estimate is irregular. If an estimate magnitude is above the threshold, then the irregular estimate may be discarded. The weighted, combined timing-frequency offset estimate is numerically oscillated by NCO 456 and provided to DDC 214 of FIG. 2.

Phase angle calculator 1 438 calculates a first phase angle (PhaseAngle1) based on pilot tone 1 from bandpass filter 432 and a reference value $P_{1r}(t)$ for pilot tone 1. The reference value $P_{1r}(t)$ may be represented as shown in Equation (4):

$$P_{1r}(t)=A e^{j2\pi(f_{1s})t} \quad (4)$$

where A is the reference amplitude and $f_{1s}$ is the reference carrier-frequency of pilot tone 1. Filtered pilot tone 1 is multiplied by the complex conjugate of reference value $P_{1r}(t)$ as shown in Equation (5) to obtain PhaseAngle1:

$$\text{PhaseAngle1}(t)=\tan^{-1}(P_1(t) \times P_{1r}^*(t))=2\pi(f_c(t)t-f_{1s}\theta_1-f_c(t)\theta_1) \quad (5)$$

Similarly, phase angle calculator 2 440 calculates a second phase angle (PhaseAngle2), by multiplying pilot tone 2 from bandpass filter 434 by the complex conjugate of a reference value $P_{2r}(t)$ for pilot tone 2. The reference value $P_{2r}(t)$ for pilot tone 2 and PhaseAngle2 may be represented as shown in Equations (6) and (7), respectively:

$$P_{2r}(t)=A e^{j2\pi(f_{2s})t} \quad (6)$$

$$\text{PhaseAngle2}(t)=\tan^{-1}(P_2(t) \times P_{2r}^*(t))=2\pi(f_c(t)t-f_{2s}\theta_2-f_c(t)\theta_2) \quad (7)$$

Note that, after the timing-frequency offset has been corrected, PhaseAngle1(t) and PhaseAngle2(t) will be sinusoidal waves with frequency $f_c$.

By rewriting Equation (5), carrier-frequency offset estimator 1 442 may calculate a first fine-carrier-frequency offset estimate based on PhaseAngle 1 as shown in Equation (8):

$$CarrierFrequencyOffset1(t) = f_c(t) \quad (8)$$

-continued $$= \frac{\left(\frac{PhaseAngle1(t)}{2\pi} + f_{1s}\theta_1\right)}{(t-\theta_1)}$$

where $\theta_1$ may be determined by (i) substituting the timing-frequency offset estimate into Equation (3), assuming that $\theta_1=\theta_2$, and (iii) solving Equation (3) for $\theta_1$. Note that this step may also be performed by phase angle calculator 1 438, and $\theta_1$ may be provided to carrier-frequency offset estimator 1 442, rather than the timing-frequency offset estimate. Similarly, by rewriting Equation (7), carrier-frequency offset estimator 2 444 may calculate a second fine carrier-frequency offset based on PhaseAngle 2 as shown in Equation (9):

$$CarrierFrequencyOffset2(t) = f_c(t) \qquad (9)$$

$$= \frac{\left(\frac{PhaseAngle2(t)}{2\pi} + f_{2s}\theta_2\right)}{(t-\theta_2)}$$

where $\theta_2$ may be determined by (i) substituting the timing-frequency offset estimate into Equation (3), assuming that $\theta_2=\theta_1$, and (iii) solving Equation (3) for $\theta_2$. This step may also be performed by phase angle calculator 1 440, and $\theta_1$ may be provided to carrier-frequency offset estimator 2 444, rather than the timing-frequency offset estimate.

The first and second fine carrier-frequency offset estimates are provided to coarse/fine carrier frequency offset combiners 446 and 448, respectively, where they are combined with the coarse carrier-frequency offset from MODSC 318. The combined carrier-frequency offset estimates from combiners 446 and 448 and the combined carrier-frequency offset estimate from combiner 408 may then be weighted, possibly equally, and combined by carrier-frequency offset combiner 450 to generate a weighted, combined estimate. Similar to the timing-frequency offset estimates, prior to weighting, the magnitudes of the carrier-frequency offset estimates may optionally be compared to a carrier-frequency offset estimate threshold to determine whether an estimate is irregular. If an estimate magnitude is above the threshold, then the irregular estimate may be discarded. The resulting weighted, combined carrier-frequency offset estimate is numerically oscillated by NCO 454 and provided to carrier-frequency offset compensator 404.

While the present invention was described relative to its use with SDARS systems, the present invention is not so limited. The present invention may be used with communication systems other than SDARS systems, such as digital subscriber line (DSL) systems. Additionally, the present invention is not limited to use with COFDM modulation techniques. The present invention may be used with multi-carrier modulation techniques other than COFDM such as non-coded orthogonal frequency division multiplexing (OFDM) techniques.

Additional embodiments of the present invention may be envisioned in which a communications system employs more than two pilot tones to generate a timing-frequency offset estimate and a carrier-frequency offset estimate. For example, certain embodiments of the present invention may use four pilot tones. In such embodiments, the number of phase angle extractors, timing-frequency calculators, carrier-frequency calculators, and coarse/fine carrier-frequency combiners would be twice that of demodulator 400 of FIG. 4. In particular, this additional processing would generate an additional timing-frequency offset estimate in a manner similar to Equation (10) and this additional estimate would be weighted and combined with the other timing-frequency offset estimates. Additionally, this processing would generate two additional carrier-frequency offset estimates in a manner similar to that of Equations (7) and (8). The two additional carrier-frequency offset estimates would be combined with the coarse carrier-frequency offset estimate and then the combined carrier-frequency offset estimates would be weighted and combined with the other combined carrier-frequency offset estimates.

While the embodiment of FIG. 4 was described in terms of generating fine-carrier frequency offset estimates and timing-frequency offset estimates using both pilot tones and cyclic prefixes, the present invention is not so limited. Certain embodiments of the present invention may generate fine-carrier frequency offset estimates and timing-frequency offset estimates using pilot tones and not cyclic prefixes. In such embodiments, fine carrier-frequency offset estimates and timing-frequency offset estimates generated by GIB carrier and timing recovery processing would not be weighted and combined with the fine carrier-frequency offset estimates and timing-frequency offset estimates generated using the pilot tones. Additionally, in certain embodiments, fine carrier-frequency offset estimates generated using pilot tones may be combined with those generated using cyclic prefixes, while timing-frequency offset estimates generated using pilot tones are not combined with those generated using cyclic prefixes. Furthermore, in certain embodiments, timing-frequency offset estimates generated using pilot tones may be combined with those generated using cyclic prefixes, while fine carrier-frequency offset estimates generated using pilot tones are not combined with those generated using cyclic prefixes.

It will be further understood that various changes in the details, materials, and arrangements of the parts which have been described and illustrated in order to explain the nature of this invention may be made by those skilled in the art without departing from the scope of the invention as expressed in the following claims.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A method applied at a receiver for processing a multi-carrier modulated signal having at least two pilot tones and at least one data tone, wherein the at least one data tone is transmitted concurrently with the at least two pilot tones, the method comprising:
   (a) generating a pilot-based carrier-frequency offset estimate based on the at least two pilot tones, wherein the pilot-based carrier-frequency offset estimate is generated in a time domain and independent of any cyclic prefix in the multi-carrier modulated signal; and
   (b) adjusting the multi-carrier modulated signal based on the pilot-based carrier-frequency offset estimate.

2. The method of claim 1, wherein:
   the method is applied, at the receiver, to the multi-carrier modulated signal that was generated at a transmitter and transmitted to the receiver;
   the multi-carrier modulated signal has a plurality of carriers; and
   the pilot-based carrier-frequency offset estimate is an estimate of differences between the frequency of a carrier of the multi-carrier modulated signal received at the receiver and the frequency of a corresponding carrier reference signal at the receiver.

3. The method of claim 1, further comprising:
   (c) generating a pilot-based timing-frequency offset estimate based on the at least two pilot tones; and
   (d) adjusting the multi-carrier modulated signal based on the pilot-based timing-frequency offset estimate.

4. The method of claim 3, wherein the pilot-based carrier-frequency offset estimate in step (b) is further generated based on the pilot-based timing-frequency offset estimate generated in step (c).

5. The method of claim 3, wherein:
   the method is applied, at a receiver, to the multi-carrier modulated signal that was generated at a transmitter and transmitted to the receiver; and
   the pilot-based timing-frequency offset estimate is an estimate of differences between the sample frequency of a multi-carrier modulated symbol received at a receiver and the sampling frequency used to decode that received multi-carrier modulated symbol.

6. The method of claim 3, wherein:
(i) the pilot-based timing-frequency offset estimate is generated by:
   determining a complex conjugate of a first of the at least two pilot tones;
   multiplying the complex conjugate by a second of the at least two pilot tones to generate a product; and
   determining the pilot-based timing-frequency offset estimate based on the difference between the frequency of the resulting product and $f_{1s} - f_{2s}$, where,
   $f_{1s}$ is a reference frequency of the first pilot tone;
   $f_{2s}$ is a reference frequency of the second pilot tone; and
(ii) the method generates a first and a second pilot-based carrier-frequency offset estimate, wherein:
   the first pilot-based carrier-frequency offset estimate is proportional to:

$$\frac{\left(\frac{PhaseAngle2(t)}{2\pi} + f_{1s}\theta_1\right)}{(t - \theta_1)}; \text{ and}$$

the second pilot-based carrier-frequency offset estimate is proportional to:

$$\frac{\left(\frac{PhaseAngle2(t)}{2\pi} + f_{2s}\theta_2\right)}{(t - \theta_2)} \text{ where,}$$

PhaseAngle1 is proportional to: $\tan^{-1}(P_1(t) * P^*_{1r}(t))$;
   PhaseAngle2 is proportional to: $\tan^{-1}(P_2(t) * P^*_{2r}(t))$;
   t is a unit of time;
   $P_1(t)$ is a received value of the first pilot tone;
   $P_2(t)$ is a received value of the second pilot tone;
   $P^*_{1r}(t)$ is a complex conjugate of a reference value $P_{1r}(t)$ of the first pilot tone;
   $P^*_{2r}(t)$ is a complex conjugate of a reference value $P_{2r}(t)$ of the second pilot tone;
   $\theta_1$ is a timing-phase delay of the first pilot tone; and
   $\theta_2$ is a timing-phase delay of the second pilot tone.

7. The method of claim 1, wherein:
   the multi-carrier modulated signal further comprises a cyclic prefix;
   step (a) further comprises:
   (a1) generating a prefix-based carrier-frequency offset estimate based on the cyclic prefix; and
   (a2) generating a combined carrier-frequency offset estimate based on the prefix-based carrier-frequency offset estimate and the pilot-based carrier-frequency offset estimate; and
   step (b) comprises adjusting the multi-carrier modulated signal based on the combined carrier-frequency offset estimate.

8. The method of claim 7, wherein step (a2) comprises:
   (a2i) comparing magnitude of the prefix-based carrier-frequency offset estimate to a specified threshold; and
   (a2ii) generating the combined carrier-frequency offset estimate independent of the prefix-based carrier-frequency offset estimate, if the magnitude of the prefix-based carrier-frequency offset estimate is greater than the specified threshold.

9. The method of claim 7, further comprising:
(c) generating a pilot-based timing-frequency offset estimate based on the at least two pilot tones;
(d) generating a prefix-based timing-frequency offset estimate based on the cyclic prefix;
(e) combining the pilot-based timing-frequency offset estimate and the prefix-based timing-frequency offset estimate to generate a combined timing-frequency offset estimate; and
(f) adjusting the multi-carrier modulated signal based on the combined timing-frequency offset estimate, wherein step (f) is implemented upstream of step (b).

10. The method of claim 1, wherein:
step (a) further comprises:
(a1) receiving a coarse carrier-frequency offset estimate derived by decoding the multi-carrier modulated signal; and
(a2) generating a combined carrier-frequency offset estimate based on the coarse carrier-frequency offset estimate and the pilot-based carrier-frequency offset estimate; and
step (b) comprises adjusting the multi-carrier modulated signal based on the combined carrier-frequency offset estimate.

11. A receiver for processing a multi-carrier modulated signal having at least two pilot tones and at least one data tone, wherein the at least one data tone is transmitted concurrently with the at least two pilot tones, the receiver comprising:
a carrier-frequency offset estimator adapted to generate a pilot-based carrier-frequency offset estimate based on the at least two pilot tones, wherein the pilot-based carrier-frequency offset estimate is generated in a time domain and independent of any cyclic prefix in the multi-carrier modulated signal; and
a carrier-frequency offset compensator adapted to adjust the multi-carrier modulated signal based on the pilot-based carrier-frequency offset estimate.

12. The receiver of claim 11, further comprising:
a timing-frequency offset estimator adapted to generate a pilot-based timing-frequency offset estimate based on the at least two pilot tones; and
a timing-frequency offset compensator adapted to adjust the multi-carrier modulated signal based on the pilot-based timing-frequency offset estimate.

13. The receiver of claim 11, wherein:
the multi-carrier modulated signal further comprises a cyclic prefix;
the carrier-frequency offset estimator is further adapted to:
(i) generate a prefix-based carrier-frequency offset estimate based on the cyclic prefix; and
(ii) generate a combined carrier-frequency offset estimate based on the prefix-based carrier-frequency offset estimate and the pilot-based carrier-frequency offset estimate; and
the carrier-frequency offset compensator is further adapted to adjust the multi-carrier modulated signal based on the combined carrier-frequency offset estimate.

14. The receiver of claim 13, further comprising:
a timing-frequency offset estimator adapted to:
(i) generate a pilot-based timing-frequency offset estimate based on the at least two pilot tones;
(ii) generate a prefix-based timing-frequency offset estimate based on the cyclic prefix; and
(iii) combine the pilot-based timing-frequency offset estimate and the prefix-based timing-frequency offset estimate to generate a combined timing-frequency offset estimate; and
a timing-frequency offset compensator adapted to adjust the multi-carrier modulated signal based on the combined timing-frequency offset estimate, wherein the timing-frequency offset compensator is implemented upstream of the carrier-frequency offset compensator.

15. A method for processing a multi-carrier modulated signal having at least two pilot tones, a cyclic prefix, and at least one data tone, wherein the at least one data tone is transmitted concurrently with the at least two pilot tones, the method comprising:
(a) generating a pilot-based timing-frequency offset estimate based on the at least two pilot tones;
(b) generating a prefix-based timing-frequency offset estimate based on the cyclic prefix;
(c) combining the pilot-based timing-frequency offset estimate and the prefix-based timing-frequency offset estimate to generate a combined timing-frequency offset estimate; and
(d) adjusting the multi-carrier modulated signal based on the combined timing-frequency offset estimate, wherein:
step (a) further comprises generating a pilot-based carrier-frequency offset estimate based on the at least two pilot tones; and
step (d) further comprises adjusting the multi-carrier modulated signal based on the pilot-based carrier-frequency offset estimate.

16. The method of claim 15, wherein step (c) comprises:
(c1) comparing magnitude of the prefix-based timing-frequency offset estimate to a specified threshold; and
(c2) generating the combined timing-frequency offset estimate independent of the prefix-based timing-frequency offset estimate, if the magnitude of the prefix-based timing-frequency offset estimate is greater than the specified threshold.

17. The method of claim 15, wherein the pilot-based timing-frequency offset estimate is generated by:
determining a complex conjugate of a first of the at least two pilot tones;
multiplying the complex conjugate by a second of the at least two pilot tones to generate a product; and
determining the pilot-based timing-frequency offset estimate based on the difference between the frequency of the resulting product and $f_{1s} - f_{2s}$ where,
$f_{1s}$ is a reference frequency of the first pilot tone; and
$f_{2s}$ is a reference frequency of the second pilot tone.

18. The invention of claim 15, wherein the pilot-based timing-frequency offset estimate is generated independent of the cyclic prefix.

19. A receiver for processing a multi-carrier modulated signal having at least two pilot tones, a cyclic prefix, and at least one data tone, wherein the at least one data tone is transmitted concurrently with the at least two pilot tones, the receiver comprising:
a timing-frequency offset estimator adapted to:
(a) generate a pilot-based timing-frequency offset estimate based on the at least two pilot tones;
(b) generate a prefix-based timing-frequency offset estimate based on the cyclic prefix; and
(c) combine the pilot-based timing-frequency offset estimate and the prefix-based timing-frequency offset estimate to generate a combined timing-frequency offset estimate; and
a timing-frequency offset compensator adapted to adjust the multi-carrier modulated signal based on the combined timing-frequency offset estimate, wherein the receiver further comprises:

a carrier-frequency offset estimator adapted to generate a pilot-based carrier-frequency offset estimate based on the at least two pilot tones; and a carrier-frequency offset compensator adapted to adjust the multi-carrier modulated signal based on the pilot-based carrier-frequency offset estimate.

20. The invention of claim 19, wherein the timing-frequency offset estimator is adapted to generate the pilot-based timing-frequency offset estimate independent of the cyclic prefix.

21. A method for processing a multi-carrier modulated signal having at least two pilot tones, the method comprising:
(a) generating a pilot-based carrier-frequency offset estimate based on the at least two pilot tones;
(b) adjusting the multi-carrier modulated signal based on the pilot-based carrier-frequency offset estimate;
(c) generating a pilot-based timing-frequency offset estimate based on the at least two pilot tones; and
(d) adjusting the multi-carrier modulated signal based on the pilot-based timing-frequency offset estimate, wherein:
(i) the pilot-based timing-frequency offset estimate is generated by:
determining a complex conjugate of a first of the at least two pilot tones;
multiplying the complex conjugate by a second of the at least two pilot tones to generate a product; and
determining the pilot-based timing-frequency offset estimate based on the difference between the frequency of the resulting product and $f_{1s}-f_{2s}$ where,
$f_{1s}$ is a reference frequency of the first pilot tone;
$f_{2s}$ is a reference frequency of the second pilot tone; and
(ii) the method generates a first and a second pilot-based carrier-frequency offset estimate, wherein:
the first pilot-based carrier-frequency offset estimate is proportional to:

$$\left(\frac{PhaseAngle1(t)}{2\pi} + f_{1s}\theta_1\right) / (t-\theta_1); \text{ and}$$

the second pilot-based carrier-frequency offset estimate is proportional to:

$$\left(\frac{PhaseAngle2(t)}{2\pi} + f_{2s}\theta_2\right) / (t-\theta_2) \text{ where,}$$

PhaseAngle1 is proportional to: $\tan^{-1}(P_1(t)*P^*_{1r}(t))$;
PhaseAngle2 is proportional to: $\tan^{-1}(P_2(t)*P^*_{2r}(t))$;
t is a unit of time;
$P_1(t)$ is a received value of the first pilot tone;
$P_2(t)$ is a received value of the second pilot tone;
$P^*_{1r}(t)$ is a complex conjugate of a reference value $P_{1r}(t)$ of the first pilot tone;
$P^*_{2r}(t)$ is a complex conjugate of a reference value $P_{2r}(t)$ of the second pilot tone;
$\theta_1$ is a timing-phase delay of the first pilot tone; and
$\theta_2$ is a timing-phase delay of the second pilot tone.

22. A method for processing a multi-carrier modulated signal having at least two pilot tones and at least one data tone, wherein the at least one data tone is transmitted concurrently with the at least two pilot tones, the method comprising:
(a) generating a pilot-based carrier-frequency offset estimate based on the at least two pilot tones; and
(b) adjusting the multi-carrier modulated signal based on the pilot-based carrier-frequency offset estimate, wherein:
the multi-carrier modulated signal further comprises a cyclic prefix;
step (a) further comprises:
(a1) generating a prefix-based carrier-frequency offset estimate based on the cyclic prefix; and
(a2) generating a combined carrier-frequency offset estimate based on the prefix-based carrier-frequency offset estimate and the pilot-based carrier-frequency offset estimate; and
step (b) comprises adjusting the multi-carrier modulated signal based on the combined carrier-frequency offset estimate.

23. The method of claim 22, wherein step (a2) comprises:
(a2i) comparing magnitude of the prefix-based carrier-frequency offset estimate to a specified threshold; and
(a2ii) generating the combined carrier-frequency offset estimate independent of the prefix-based carrier-frequency offset estimate, if the magnitude of the prefix-based carrier-frequency offset estimate is greater than the specified threshold.

24. The method of claim 22, further comprising:
(c) generating a pilot-based timing-frequency offset estimate based on the at least two pilot tones;
(d) generating a prefix-based timing-frequency offset estimate based on the cyclic prefix;
(e) combining the pilot-based timing-frequency offset estimate and the prefix-based timing-frequency offset estimate to generate a combined timing-frequency offset estimate; and
(f) adjusting the multi-carrier modulated signal based on the combined timing-frequency offset estimate, wherein step (f) is implemented upstream of step (b).

25. A receiver for processing a multi-carrier modulated signal having at least two pilot tones and at least one data tone, wherein the at least one data tone is transmitted concurrently with the at least two pilot tones, the receiver comprising:
a carrier-frequency offset estimator adapted to generate a pilot-based carrier-frequency offset estimate based on the at least two pilot tones;
a carrier-frequency offset compensator adapted to adjust the multi-carrier modulated signal based on the pilot-based carrier-frequency offset estimate, wherein:
the multi-carrier modulated signal further comprises a cyclic prefix;
the carrier-frequency offset estimator is further adapted to:
(i) generate a prefix-based carrier-frequency offset estimate based on the cyclic prefix; and
(ii) generate a combined carrier-frequency offset estimate based on the prefix-based carrier-frequency offset estimate and the pilot-based carrier-frequency offset estimate; and
the carrier-frequency offset compensator is further adapted to adjust the multi-carrier modulated signal based on the combined carrier-frequency offset estimate.

26. The receiver of claim 25, further comprising:
a timing-frequency offset estimator adapted to:
(i) generate a pilot-based timing-frequency offset estimate based on the at least two pilot tones;
(ii) generate a prefix-based timing-frequency offset estimate based on the cyclic prefix; and (iii) combine the pilot-based timing-frequency offset estimate and the prefix-based timing-frequency offset estimate to generate a combined timing-frequency offset estimate; and a timing-frequency offset compensator adapted to adjust the multi-carrier modulated signal based on the combined timing-frequency offset estimate, wherein the timing-frequency offset compensator is implemented upstream of the carrier-frequency offset compensator.

27. A method for processing a multi-carrier modulated signal having at least two pilot tones and a cyclic prefix, the method comprising:
 (a) generating a pilot-based timing-frequency offset estimate based on the at least two pilot tones;
 (b) generating a prefix-based timing-frequency offset estimate based on the cyclic prefix;
 (c) combining the pilot-based timing-frequency offset estimate and the prefix-based timing-frequency offset estimate to generate a combined timing-frequency offset estimate; and
 (d) adjusting the multi-carrier modulated signal based on the combined timing-frequency offset estimate, wherein step (c) comprises:
   (c1) comparing magnitude of the prefix-based timing-frequency offset estimate to a specified threshold; and
   (c2) generating the combined timing-frequency offset estimate independent of the prefix-based timing-frequency offset estimate, if the magnitude of the prefix-based timing-frequency offset estimate is greater than the specified threshold.

28. A method for processing a multi-carrier modulated signal having at least two pilot tones and a cyclic prefix, the method comprising:
 (a) generating a pilot-based timing-frequency offset estimate based on the at least two pilot tones;
 (b) generating a prefix-based timing-frequency offset estimate based on the cyclic prefix;
 (c) combining the pilot-based timing-frequency offset estimate and the prefix-based timing-frequency offset estimate to generate a combined timing-frequency offset estimate; and
 (d) adjusting the multi-carrier modulated signal based on the combined timing-frequency offset estimate, wherein the pilot-based timing-frequency offset estimate is generated by:
   determining a complex conjugate of a first of the at least two pilot tones;
   multiplying the complex conjugate by a second of the at least two pilot tones to generate a product; and
   determining the pilot-based timing-frequency offset estimate based on the difference between the frequency of the resulting product and $f_{1s}-f_{2s}$, where,
   $f_{1s}$ is a reference frequency of the first pilot tone; and
   $f_{2s}$ is a reference frequency of the second pilot tone.

29. A method for processing a multi-carrier modulated signal having at least two pilot tones, the method comprising:
 (a) generating a pilot-based carrier-frequency offset estimate based on the at least two pilot tones; and
 (b) adjusting the multi-carrier modulated signal based on the pilot-based carrier-frequency offset estimate, wherein:
 the multi-carrier modulated signal further comprises a cyclic prefix;
 step (a) further comprises:
   (a1) generating a prefix-based carrier-frequency offset estimate based on the cyclic prefix; and
   (a2) generating a combined carrier-frequency offset estimate based on the prefix-based carrier-frequency offset estimate and the pilot-based carrier-frequency offset estimate; and
 step (b) comprises adjusting the multi-carrier modulated signal based on the combined carrier-frequency offset estimate, wherein step (a2) comprises:
   (a2i) comparing magnitude of the prefix-based carrier-frequency offset estimate to a specified threshold; and
   (a2ii) generating the combined carrier-frequency offset estimate independent of the prefix-based carrier-frequency offset estimate, if the magnitude of the prefix-based carrier-frequency offset estimate is greater than the specified threshold.

* * * * *

UNITED STATES PATENT AND TRADEMARK OFFICE
CERTIFICATE OF CORRECTION

PATENT NO. : 8,270,502 B2  
APPLICATION NO. : 11/956589  
DATED : September 18, 2012  
INVENTOR(S) : Yhean-Sen Lai Page 1 of 1

It is certified that error appears in the above-identified patent and that said Letters Patent is hereby corrected as shown below:

In Claim 6, Line 20, please replace " $\left(\frac{PhaseAngle\ 2(t)}{2\pi} + f_{1s}\theta_1\right) \Big/ (t - \theta_1)$ ; and " with -- $\left(\frac{PhaseAngle\ 1(t)}{2\pi} + f_{1s}\theta_1\right) \Big/ (t - \theta_1)$ ; and --.

Signed and Sealed this  
Eighth Day of January, 2013

David J. Kappos  
*Director of the United States Patent and Trademark Office*

UNITED STATES PATENT AND TRADEMARK OFFICE
CERTIFICATE OF CORRECTION

PATENT NO. : 8,270,502 B2  
APPLICATION NO. : 11/956589  
DATED : September 18, 2012  
INVENTOR(S) : Yhean-Sen Lai Page 1 of 1

It is certified that error appears in the above-identified patent and that said Letters Patent is hereby corrected as shown below:

Column 10, lines 22-25 (Claim 6, line 20), please replace " $\left(\frac{PhaseAngle\ 2(t)}{2\pi} + f_{1s}\theta_1\right) / (t - \theta_1)$ ; and " with -- $\left(\frac{PhaseAngle\ 1(t)}{2\pi} + f_{1s}\theta_1\right) / (t - \theta_1)$ ; and --.

This certificate supersedes the Certificate of Correction issued January 8, 2013.

Signed and Sealed this  
Nineteenth Day of February, 2013

Teresa Stanek Rea  
*Acting Director of the United States Patent and Trademark Office*